United States Patent [19]

Griffin

[11] Patent Number: 4,735,592
[45] Date of Patent: Apr. 5, 1988

[54] SIMULATED MOTORCYCLE EXHAUST PIPE AND ENGINE SOUND DEVICE FOR BICYCLES

[76] Inventor: Leonard R. Griffin, 351 N. Church St., St. Peters, Mo. 63376

[21] Appl. No.: 914,768

[22] Filed: Oct. 3, 1986

[51] Int. Cl.$^4$ ............................................. A63H 5/00
[52] U.S. Cl. .................. 446/404; 280/1.11 R; 280/289 R
[58] Field of Search .................. 446/413, 404, 397; 280/289 R, 1.11 R; 403/347, 379; 248/151, 152

[56] References Cited

U.S. PATENT DOCUMENTS

| | | | |
|---|---|---|---|
| 1,192,557 | 7/1916 | Pfeffer | 248/151 |
| 1,302,389 | 4/1919 | Lemons | 446/413 |
| 3,754,350 | 8/1973 | Gorke | 446/404 |
| 3,942,822 | 3/1976 | Lewis | 280/289 R |
| 4,151,677 | 5/1979 | Tucker | 446/404 |

Primary Examiner—James T. McCall
Attorney, Agent, or Firm—Haverstock, Garrett and Roberts

[57] ABSTRACT

A simulated motorcycle exhaust pipe and engine sound device for bicycles including a hollow member which can be outwardly flared from a front end to an open end. This construction simulates, in appearance, an exhaust pipe. A removable spoke engaging member is engaged with the hollow member. When the device is mounted on a bicycle, the spoke engaging member extends between spokes of the bicycle wheel. Means for removably mounting the device to a bike frame are provided. As the bicycle wheel rotates, the spoke engaging member successively engages with the spokes of the bicycle causing the spoke engaging member to vibrate. These vibrations resonate through the hollow member to produce a realistic combustion engine sound.

6 Claims, 2 Drawing Sheets

SIMULATED MOTORCYCLE EXHAUST PIPE AND ENGINE SOUND DEVICE FOR BICYCLES

BACKGROUND OF THE INVENTION (1) Field of Invention

This invention relates to a device for bicycles which simulates a combustion engine sound and also simulates, in appearance, an exhaust pipe.

(2) Brief Description of the Prior Art

Known engine sound simulating devices include those disclosed in U.S. Pat. Nos. 3,439,926, 3,210,889, 2,620,764, Swedish Pat. No. 138,147, and French Pat. No. 1,026,975. Some of the known constructions have side plates which have a plastic finger or contact arm mounted therein. The side plate generally is integrally mounted on a bicycle frame so that the plastic finger or contact arm successively engages with spokes of a bicycle wheel as the wheel rotates and creates vibrations. Other known constructions disclose devices wherein a rotatable member engages with a bicycle wheel and a contact arm engages with the rotatable member. The rotatable member generally has notches therein and the contact arm vibrates as it successively engages with the notches. In the known constructions, the vibrations usually are not directed or concentrated in one direction or area. Also, the known constructions disclose devices wherein the plastic finger or contact arm is impossible or difficult to replace because the entire device must be replaced or disassembled in order to replace a worn plastic finger. Furthermore, the known constructions are large and bulky and therefore are not adaptable for mounting on a wide variety of bicycle frames.

SUMMARY OF THE INVENTION

The present device produces a realistic combustion engine sound by a novel simulated exhaust pipe and engine sound device which includes a conical hollow member which is outwardly flared from one end to the other end. The conical hollow member has at least two openings therethrough which are on opposing sides and in horizontal alignment with each other and adapted for retaining a finger or contact arm. When the device is mounted on a bike frame, the two openings generally will be on a plane which is parallel to the ground and at a right angle to the plane of the bike frame when in an upright position.

The conical hollow member also has two openings therethrough which are on opposing sides and in vertical alignment with each other. These openings generally will be in a plane substantially perpendicular to the plane passing through the horizontal openings and adapted for holding in place means for retaining the finger or contact arm.

A flexible spoke engaging member, a finger or contact arm, is slidably engaged through both horizontal openings of the conical hollow member. The flexible spoke engaging member can be any shape, and in a preferred embodiment, an elongated member having a rectangular cross-sectional area is utilized. Also, the spoke engaging member has at least one opening therethrough, and when the member is slidably engaged through both horizontal openings of the conical hollow member, the vertical openings though the conical hollow member align with the opening through the spoke engaging member.

When the spoke engaging member is positioned through the horizontal openings of the conical hollow member, a means, such as a pin, for maintaining engagement between the flexible spoke engaging member and the conical hollow member is passed through the vertical openings in the conical hollow member and the opening in the flexible member to complete the unit prior to or after attachment to a bicycle. The means for retaining the spoke engaging member in position in the conical hollow member may be any known device such as a pin, a bolt, a key, or a peg. This simple means for engaging the flexible member to the conical hollow member permits easy access to and replacement of the flexible member without damaging the device. Also, the entire device does not have to be disassembled in order to replace the spoke engaging member.

The device may be mounted on a bicycle in any conventional manner. In one preferred embodiment, the device has a longitudinal groove which extends the length of the device. The groove is located on the one side from which the flexible member substantially extends. The grove is adapted to mate with a portion of a bike frame and clamps may be used to removably engage the conical hollow member to a bike frame. The device should be mounted so that the one end of the flexible member which extends outwardly from one side of the conical hollow member extends through the other side of the conical hollow member and between spokes of a bicycle wheel. The conical hollow member usually is positioned on a bicycle frame so that the end with a smaller cross-sectional area points toward the direction of travel and thus, the conical hollow member, when properly mounted on a bicycle frame, simulates in appearance, an exhaust pipe. Also, because the means for engaging the present device to a bicycle frame does not require that the device be integrally mounted and because a minimal number of parts for mounting the conical hollow member to a bicycle frame are needed, the device can be used with almost every type or design of bicycle.

When the bicycle wheel rotates, the flexible member successively engages with spokes of the bicycle wheel causing the flexible member to vibrate. The design and placement of the conical member allows the conical member to act as a resonator and thus, when the vibrations of the flexible member are transferred to the conical hollow member, the vibrations resonate through the member towards the open flared end of the member. The vibrations are concentrated and directed towards the open end of the conical hollow member thus creating a louder and more realistic combustion engine sound.

An object of the present invention is to provide a simulated motorcycle exhaust pipe and engine sound device which can be easily attached to and detached from a bicycle frame.

A further important object of the present invention is to provide a flexible spoke engaging member which is easily replaceable.

A still further object of the present invention is to provide a light weight and compact device which simulates a motorcycle exhaust pipe and engine sound.

These and other objects and advantages of the present invention will become apparent after considering the following detailed specification in conjunction with the accompanying drawings, wherein:

DESCRIPTION OF PREFERRED EMBODIMENTS

Figure 1:
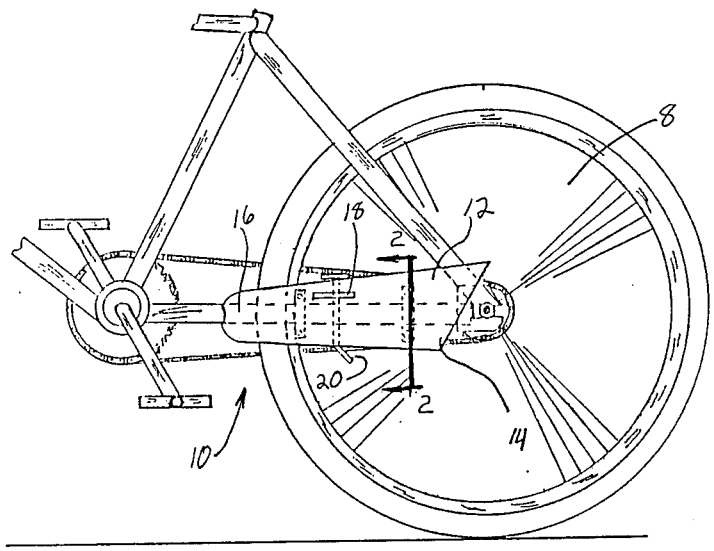
FIG. 1 is a side view of a simulated motorcycle exhaust pipe and engine sound device mounted on a bicycle frame.

Referring to the drawings, more particularly by reference numbers, FIG. 1 shows a simulated motorcycle exhaust pipe and engine sound device 10 constructed according to the present invention attached to a bicycle 8. The device 10 which is engaged to a bicycle 8 has attached thereto a conical hollow member 12 with an open end 14 and which is flared from end 16 to the open end 14. The device 10 also has a removable spoke engaging member 18 which extends through the conical hollow member 12. The spoke engaging member 18 is held in place by a pin 20.

Figure 2:
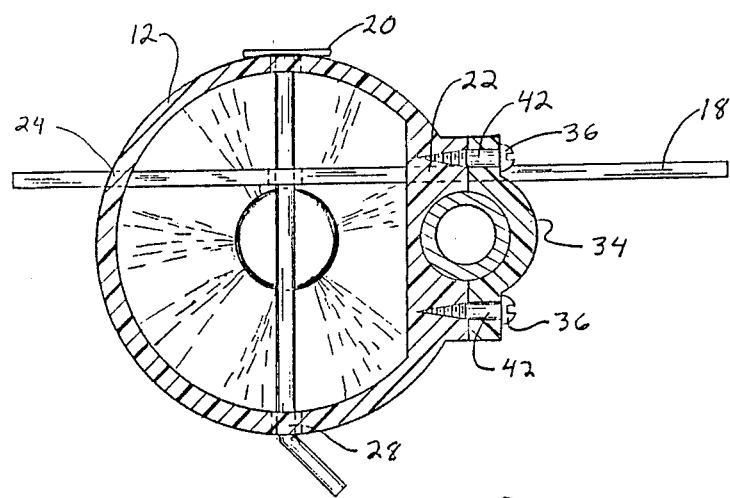
FIG. 2 is an enlarged cross-sectional view of the motorcycle exhaust pipe and engine sound device taken on line 2—2 of FIG. 1.
Figure 6:
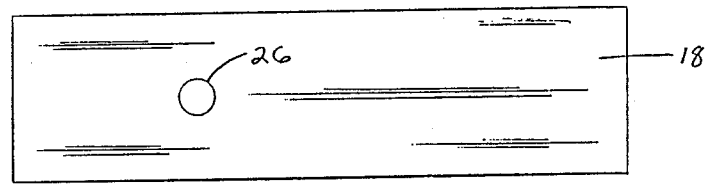
FIG. 6 is a top view of the spoke engaging member.
Figure 7:
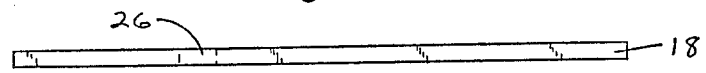
FIG. 7 is a side view of the spoke engaging member shown in FIG. 6.
Figure 5:
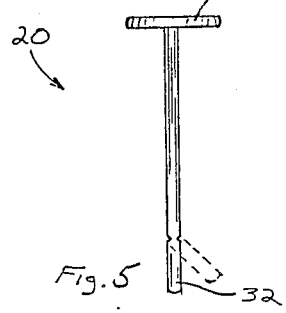
FIG. 5 is a side view of the pin used to hold the spoke engaging member and conical hollow member in an assembled condition.

As shown in FIG. 2, the conical hollow member has two opposite openings in the form of slits 22 and 24 therein which are generally horizontal when the device is in place on an upright bicycle. The spoke engaging member 18 (FIGS. 6 and 7) extends through the horizontal slits 22 and 24. An opening 26 in the spoke engaging member 18 aligns with the opposite vertical openings 27 and 28 through the conical hollow member 12. A pin 20 which has a head portion 30 and a bendable portion 32 (FIG. 5) passes through the vertical openings 27 and 28 of the conical hollow member 12 and the opening 26 in the spoke engaging member 16 and thus, the device 10 is held in an assembled condition.

Figure 3:
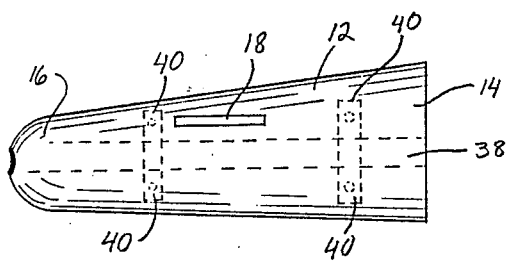
FIG. 3 is a side view of the simulated motorcycle exhaust pipe and engine sound device.
Figure 4:
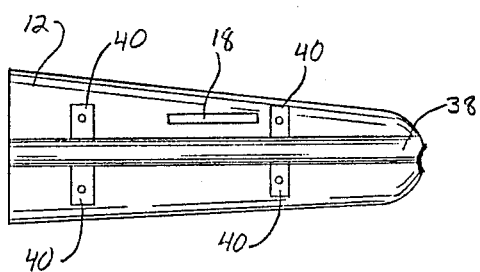
FIG. 4 is a view of the side of the motorcycle exhaust pipe and engine sound device which is adapted for engagement to a bicycle.

As shown in FIG. 2, the conical hollow member 12 is engaged to a bike frame by clamps 34 and threaded members 36. As best illustrated in FIGS. 3 and 4, the conical hollow member 12 has a longitudinal groove 38 which extends the length of the member 12. The conical hollow member also has reinforced openings 40 which align with openings 42 (FIG. 2) through the clamps 34. When the device 10 is mounted to a bike frame, a portion of the bike frame is inserted in the longitudinal groove 38 of the conical hollow member 12, and then clamps 34 are placed on the bike frame and the openings 42 through the clamps 34 align with the reinforced openings 40 of the conical hollow member 12. Threaded members 36 then pass through the clamp openings 42 and are threadedly engaged and tightened into the reinforced openings 40 of the conical hollow member 12 thereby connecting the device 10 to the bicycle frame 8. The simple mounting means allows the present device 10 to be used with almost any style or design of a bicycle. When the device 10 is properly mounted, the spoke engaging member 18 extends between spokes of a bicycle wheel and as the bicycle wheel rotates, the spoke engaging member 18 successively engages with spokes of the wheel causing the spoke engaging member 18 to vibrate. These vibrations are transferred to the conical hollow member and the design of the conical member 12 causes the vibrations to resonate towards the open end 14 of the conical hollow member 12. The vibrations are thus concentrated and directed in one direction thereby creating a louder and more realistic combustion engine sound.

Figure 8:
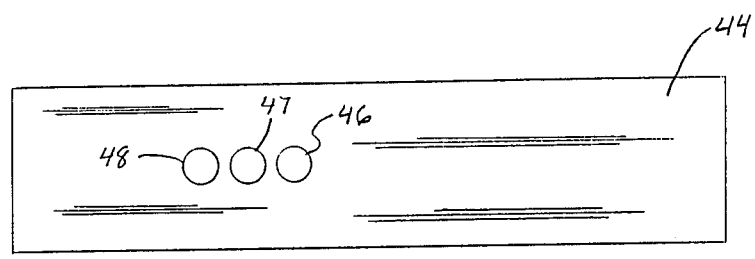
FIG. 8 is a top view of an alternative spoke engaging member which could be used with the simulated motorcycle exhaust pipe and engine sound device.

FIG. 8 shows a different embodiment of a spoke engaging member 44 which has three openings 46, 47 and 48 rather than one. Thus, as the spoke engaging member 44 becomes worn, the member 44 can be extended further from opening 46 to opening 48 into spokes of a bicycle wheel and thus still create a loud and realistic combustion engine sound with a worn spoke engaging member 44.

The component parts of the device of this invention are preferably made of plastic compositions. The conical hollow member of the device of this invention may be molded or otherwise constructed of plastic compositions ranging from substantially rigid to slightly flexible compositions. Such compositions include well known polymeric materials such as polycarbonates, nylons, polyolefins, polyvinyl chloride resins, polymers and copolymers of styrene-butadiene-acrylonitrile, and other polymerics identified as engineering plastics. A preferred material is polypropylene because it is inexpensive and easily molded. The flexible spoke engaging member may be made from any well known flexible plastic composition which includes polyolefins, polyvinyl chloride resins, flexible nylons, polyurethane resins, and other known flexible plastic compositions. A preferred spoke engaging member is fabricated from polyethylene.

Although the device of this invention has been described as being fabricated from plastic materials, other materials may be used in the construction of the device and may be used to produce a different desired sound effect. For example, the flexible spoke engaging member could be made from a metal such as brass or steel or even from a wood product to produce a different sound. Likewise, the conical hollow member may be fabricated from other known materials such as wood, various metals, and other materials which may also provide different desired resonance. In addition, the conical hollow member may contain baffles, and even whistles to provide a different effect. If desired, as a convenience in construction or for any other reason the conical hollow member may be elliptical in configuration and may be in the form of a non-flared straight-sided hollow member. The end of the conical hollow member which has a smaller cross-sectional area than the other end preferably has an opening adapted for allowing air to enter and pass through the conical hollow member which may be useful in improving resonance and in activating internal constructions such as a whistle. Also, the conical hollow member may be made so that the end with a smaller cross-sectional area is closed or has a closable opening. Also included within the concept of the construction of the conical hollow member would be a construction made in two or more overlapping parts so that the flared portion could be expanded or contracted to produce different sounds.

Also, the shape of the flexible spoke engaging member may be of any desired configuration such as the elongated strip described herein but it may also be in the form of a rod, a pipe, or any other desired configuration.

Thus, there has been shown and described a novel simulated motorcycle exhaust pipe and engine sound device for bicycles which fulfills all of the objects and advantages sought therefor. It will be apparent to those skilled in the art, however, that many changes, modifications, variations, and other uses and applications of the subject device are possible and contemplated, and all such changes, modifications, variations and other uses and applications which do not depart from the spirit and scope of the invention are deemed to be covered by the invention which is limited only by the claims which follow.

What is claimed is:

1. A simulated engine sound and exhaust pipe device for bicycles comprising a hollow member, a spoke engaging member, said hollow member having at least two horizontal openings therein and at least two vertical openings therethrough adapted for removably retaining said spoke engaging member in position when said device is mounted on a bicycle, said spoke engaging member having at least one opening therethrough, and said opening through said spoke engaging member being in alignment with said vertical openings through said hollow member, a removable pin passed through said aligned openings of the hollow member and spoke engaging member for maintaining engagement between said spoke engaging member and said conical hollow member and means for removably attaching said device to a bicycle frame whereby said spoke engaging member extends between spokes of a bicycle wheel.

2. The simulated engine sound and exhaust pipe device for bicycles of claim 1 wherein said hollow member is conically shaped.

3. The simulated engine sound and exhaust pipe device for bicycles of claim 1 wherein said hollow member has a front end and an open end and is flared outwardly from said front end to said open end.

4. The simulated engine sound and exhaust pipe device for bicycles of claim 1 wherein said horizontal openings are slits which have an elongated spoke engaging member in rectangular cross section inserted therethrough, said spoke engaging member having at least one opening therethrough.

5. The simulated engine sound and exhaust pipe device of claim 1 wherein said means for removably attaching said device to a bicycle frame includes a longitudinal groove in said hollow member, said longitudinal groove adapted to receive a portion of a bike frame and means for attaching said device to said bicycle frame.

6. A simulated engine sound and exhaust pipe device for bicycles comprising a conical hollow member having a front end and an open end and being flared from said front end to said open end, said conical hollow member having at least two slits therethrough, said slits being on opposing sides and in horizontal alignment when said device is attached to a bicycle in an upright position, said conical hollow member having at least two vertical openings therethrough, said openings being on opposing sides and in vertical alignment when said device is attached to a bicycle in an upright position, a spoke engaging member, said spoke engaging member having a plurality of openings therethrough, said spoke engaging member passing through said horizontal slits and at least one of said openings in said spoke engaging member being in alignment with said vertical openings in said conical hollow member when said spoke engaging member and said conical hollow member are positioned in an assembled condition, removable means for maintaining engagement between said spoke engaging member and said conical hollow member, said conical hollow member having a longitudinal groove therein adapted to receive a portion of a bike frame, clamps for maintaining engagement between said bike frame and said device.

* * * * *